(12) United States Patent
Chiarini

(10) Patent No.: US 8,897,927 B2
(45) Date of Patent: Nov. 25, 2014

(54) DATA COLLECTION APPARATUS AND PORTABLE DATA COLLECTION DEVICE

(75) Inventor: Alessandro Chiarini, Castel Maggiore (IT)

(73) Assignee: Datalogic Mobile S.R.L., Lippo di Calderara di Reno (BO) (IT)

( * ) Notice: Subject to any disclaimer, the term of this patent is extended or adjusted under 35 U.S.C. 154(b) by 26 days.

(21) Appl. No.: 13/142,020

(22) PCT Filed: Dec. 30, 2008

(86) PCT No.: PCT/IB2008/003654
§ 371 (c)(1),
(2), (4) Date: Jun. 24, 2011

(87) PCT Pub. No.: WO2010/076585
PCT Pub. Date: Jul. 8, 2010

(65) Prior Publication Data
US 2011/0257811 A1    Oct. 20, 2011

(51) Int. Cl.
*B60T 8/172* (2006.01)
*G06K 7/10* (2006.01)
*B60R 11/00* (2006.01)

(52) U.S. Cl.
CPC ............ *G06K 7/10* (2013.01); *B60R 2011/0075* (2013.01); *B60R 11/00* (2013.01)
USPC .................... 701/1; 701/2; 701/33.4; 701/36; 701/500; 701/538; 439/34; 439/297; 439/529; 455/1; 455/418; 455/556.1; 455/557

(58) Field of Classification Search
CPC .... B60T 8/172; G07C 5/008; B60R 16/0231; B60R 16/0315; B60G 17/0195
USPC ................. 701/1, 32.4, 33.4, 41, 2, 444, 409; 342/357.59, 870.07, 933, 5.6; 297/452.29; 704/235; 439/34, 297, 529
See application file for complete search history.

(56) References Cited

U.S. PATENT DOCUMENTS

| 6,803,674 | B2 | 10/2004 | Crisp |
| 8,294,598 | B2 * | 10/2012 | Ozaki et al. .............. 340/995.13 |
| 2002/0133293 | A1 * | 9/2002 | Goldman ...................... 701/213 |
| 2003/0096593 | A1 | 5/2003 | Naboulsi |

(Continued)

FOREIGN PATENT DOCUMENTS

| EP | 0715273 A2 | 5/1996 |
| FR | 2847409 A | 5/2004 |
| WO | WO2008/033753 A2 | 3/2008 |
| WO | WO 2009/066119 A1 | 5/2009 |

OTHER PUBLICATIONS

International Search Report dated Aug. 19, 2009 from corresponding PCT Application No. PCT/IB2008/003654.

*Primary Examiner* — Helal A Algahaim
*Assistant Examiner* — Jelani Smith
(74) *Attorney, Agent, or Firm* — Duane Morris LLP

(57) ABSTRACT

An apparatus includes a portable device, a supporting base associable with a vehicle and connecting means to lock, or release, the device in the base. The apparatus further includes detecting means for detecting at least an operating parameter of the vehicle, interface means for setting an operating state of the device and control means, connected to the detecting means and to the interface means to command the connecting means, as a function of the operating parameter and/or of the operating state.

29 Claims, 7 Drawing Sheets

(56) References Cited

U.S. PATENT DOCUMENTS

| | | | |
|---|---|---|---|
| 2004/0143376 A1* | 7/2004 | Rosseau | 701/29 |
| 2005/0099262 A1* | 5/2005 | Childress et al. | 340/5.6 |
| 2005/0205739 A1* | 9/2005 | DePue et al. | 248/311.2 |
| 2006/0076820 A1* | 4/2006 | Lackore | 297/452.29 |
| 2007/0069030 A1 | 3/2007 | Sauerwein, Jr. et al. | |
| 2008/0099563 A1 | 5/2008 | Wormald et al. | |
| 2008/0211641 A1* | 9/2008 | Murray et al. | 340/426.12 |
| 2008/0274628 A1* | 11/2008 | Chauvelier et al. | 439/34 |
| 2009/0005969 A1* | 1/2009 | Tamura | 701/202 |
| 2011/0148658 A1* | 6/2011 | Murray et al. | 340/870.07 |
| 2011/0223802 A1* | 9/2011 | Zeller et al. | 439/529 |
| 2011/0257973 A1* | 10/2011 | Chutorash et al. | 704/235 |

* cited by examiner

DATA COLLECTION APPARATUS AND PORTABLE DATA COLLECTION DEVICE

BACKGROUND AND SUMMARY OF THE INVENTION

The invention relates to a data collection apparatus comprising a portable data collection device, a supporting base arranged for receiving the portable data collection device and connecting means for removably locking the portable data collection device to a supporting base.

The portable data collection device comprises a data acquisition and possibly management device, and is intended for interacting with a base for recharging the battery and/or exchanging data. The portable data collection device can be a PDT (portable data terminal) i.e. a portable terminal for the automatic or manual acquisition of data, or, in general, a portable automatic identification device such as a portable reader of optical information or of coded information stored in a transponder (or also in what in English is known as a Radio Frequency Identification Device or "RFID tag").

Data-collection apparatuses are known comprising a reading device of optical information, for example barcodes or RFID tags, which can be grasped by an operator and is thus portable. The data-collection apparatus may further comprise a supporting base arranged for receiving the reading device, when it is not in use. The supporting base may comprise a battery-charging device that supplies batteries with which the reading device is provided. Alternatively, if the battery-charging device is contained in the reading device, the supporting base comprises a supply circuit for the battery charger. The reading device can thus assume a use configuration in which it is grasped by the user to acquire the optical information, or the RFID tags, and a rest configuration, in which it is received and retained by the supporting base so that the batteries can, if necessary, be recharged.

The reading device can be connected to the supporting base by a radio-frequency device. The supporting base receives from the reading device, via the radio-frequency device, the read information and transmits the information to a computer host (also called "processing host computer" in English).

The reading device can also be devoid of a data connection with the base and be connected to a processing host computer by GPRS or WiFI or not have radio connections and be used for reading data until it is connected to a second supporting base connected to a processing host computer (for example, the GPRS device uses a first supporting base located in a vehicle for recharging the batteries, storing the acquired data, and uses a second supporting base, usually separate with respect to the first supporting base and located in an office, to download data).

The reading apparatus may comprise connecting means arranged for retaining the reading device in the supporting base so as to maintain the reading device in the rest configuration, i.e. to prevent the reading device accidentally disengaging from the supporting base. The connecting devices are provided in particular in the reading apparatuses that are intended for mechanical stress, for example inasmuch as they are subject to shocks and/or vibrations.

From international patent application PCT/IB2007/003539, a data collection apparatus is known that is provided with a portable data collection device, for example a PDT, (portable data terminal), which is firmly coupled with a supporting element in a rest configuration and is easily separable from the supporting element to change to an operating configuration. Magnetic connecting means is provided for removably retaining said portable data collection device in the supporting element so that, when the portable data collection device and the corresponding supporting base are installed in a vehicle, such as, for example, a forklift intended for circulating inside a company or more generally a vehicle intended for circulating on the road, can be firmly connected to the supporting base thereof whilst enabling the driver to remove the portable data collection device from the seat using a single hand. It is in fact sufficient for the driver, or more in general a user, to place a hand near the portable data collection device that is firmly connected to the supporting base, for a sensor device on the supporting base to recognise the presence of a hand and enable the portable data collection device to be removed.

In the case of an operator who performs itinerant work, the portable device for data collection is usually housed inside the vehicle, normally a motor car or a lorry/van, and usually the supporting base is fixed in the passenger compartment so as to be easily reachable by the driver.

A drawback of the reading apparatus disclosed above consists of the fact that removing the portable data collection device from the base is always permitted, even whilst the vehicle is moving. When in fact the driver needs to consult the portable data collection device during a movement, the removing of the device from the base is permitted and this exposes the driver to a high risk of accidents due to a loss of attention during driving.

Moreover, recently portable data-collection devices have appeared on the market that contain an increasing number of functions. For example, portable data-collection devices are already present on the market that are able to integrate data collection with satellite navigation systems, such as, for example a GPS (Global Positioning System).

In the latter case, usually the portable data-collection device is installed in an orientatable base, so as to arrange the data-collection device vertical with the display always visible to favour the display of road maps. In the latter case in particular, the driver might frequently consult the road map with the vehicle in motion and with the data-collection device extracted from the base, so as to constitute a source of danger for the driver.

An object of the invention is to improve known data-collection devices.

A further object is to obtain a data collection apparatus provided with a portable data collection device, for example a PDT (portable data terminal), i.e. a portable terminal for the automatic or manual acquisition of data, or, in general, an automatic portable identification device such as a portable reader of optical information or of codified information stored in an RFID tag, that is stably retained by the supporting base during movements of the vehicle without accidental unhooking thereof, is rapidly removable when the vehicle is stationary and prevents the driver from picking up the portable data collection device from the supporting base whilst the vehicle is in motion.

In a first aspect of the invention, a portable device engageable in a supporting base associable with a vehicle is provided.

In a second aspect of the invention, a supporting base is provided.

In a third aspect of the invention, an apparatus is provided.

In a fourth aspect of the invention, a method for controlling an apparatus is provided.

Owing to these aspects of the invention it is possible to make a data-collecting device that can be locked to a respective supporting base at preset operating statuses that are definable by a user and/or connected to preset physical operating parameters. In particular, it is possible to configure automatically the electromagnetic connecting means, commanding the locking of the portable data collection device so as to prevent the user removing the portable data collection device from the supporting base when the operating state does not allow this.

For example, when the operating parameter consists of the speed of a vehicle with which said device is associated, it is possible to set a threshold value at the exceeding of which the device is placed in a "locked" operating status i.e. fixed to the respective supporting base without the possibility of being extracted. In this mode, for example, the driver can no longer extract the device with the vehicle in motion and is thus not subject to distraction.

Otherwise, when the operating parameter consists of the geographical location, and, for example, the vehicle with which the device is associated is a forklift intended for circulation inside a company, it is possible to set a geographical coordinate value as a threshold value, so that the driver cannot remove said device from the company premises.

It is further possible for the user to define a "locked" operating state independently of the value of the physical parameter by means of a graphic user interface of the device, for example to make an antitheft function, which is useful in the event of a temporary halt of the vehicle.

BRIEF DESCRIPTION OF THE DRAWINGS

The invention can be better understood and implemented with reference to the attached drawings that illustrate some embodiments thereof by way of non-limiting example, in which.

DETAILED DESCRIPTION

Figure 1:
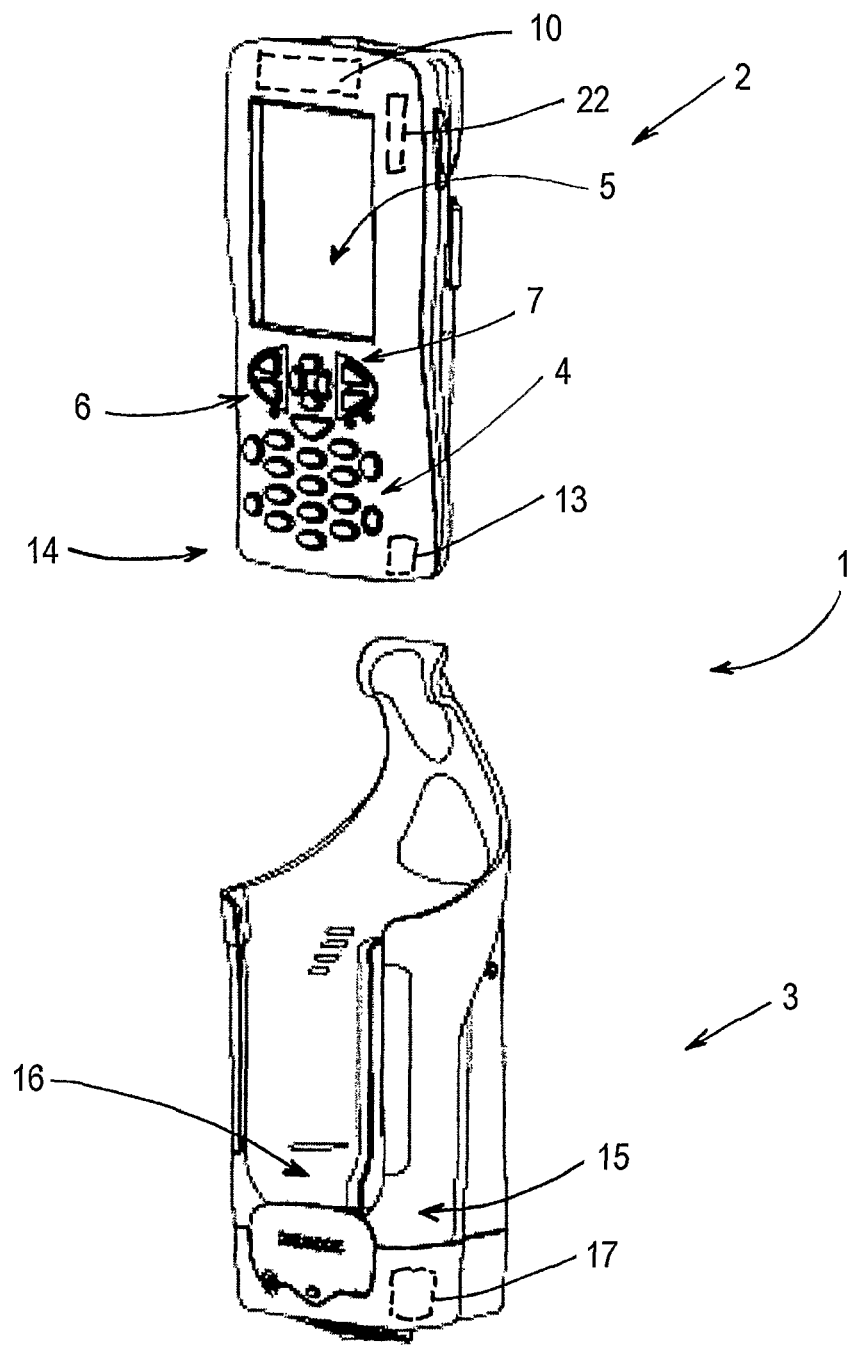
FIG. 1 is a perspective view of a portable data collection device and of a supporting base in a first operating configuration.
Figure 2:
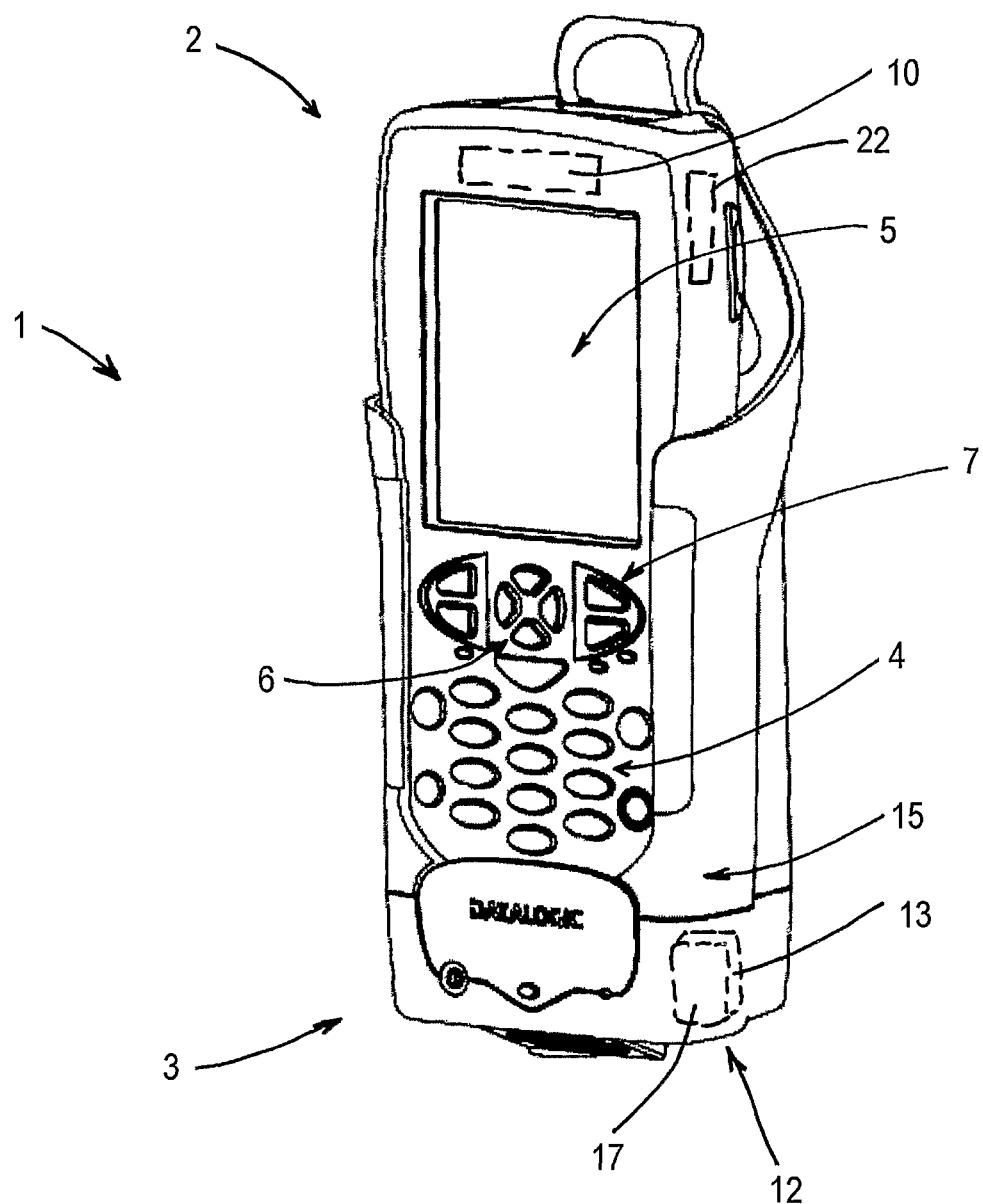
FIG. 2 is a perspective view of the portable data collection device and of the supporting base in FIG. 1 in a second operating configuration.

With reference to FIGS. 1 and 2, there is shown a data collection apparatus 1 comprising a portable data-collection device 2 (henceforth indicated as terminal for the sake of brevity) and a supporting base 3.

Figure 5:
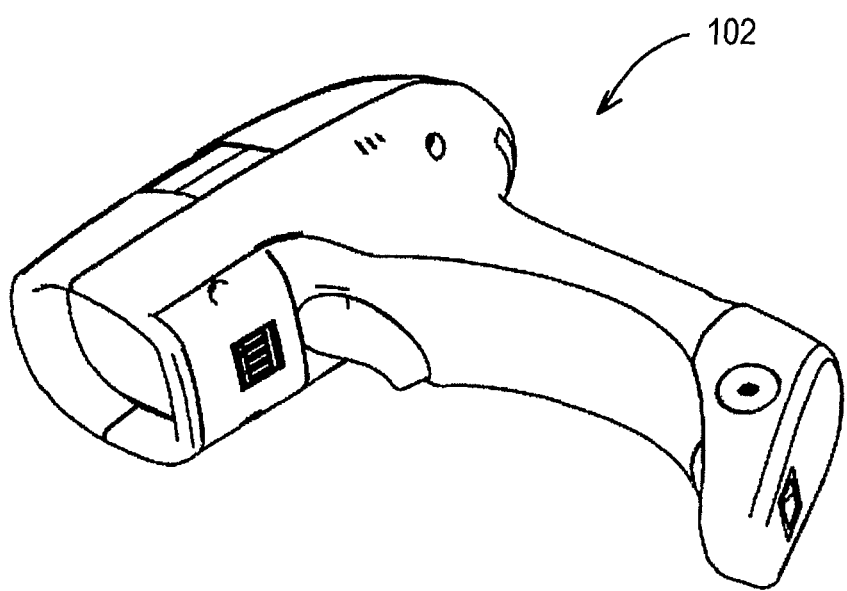
FIG. 5 is a perspective view of a further portable data collection device or of a portable reading device.

Alternatively, a data collection apparatus can be provided comprising a reading device as illustrated in FIG. 5 or in FIGS. 6 and 7, as will be disclosed below.

Figure 3:
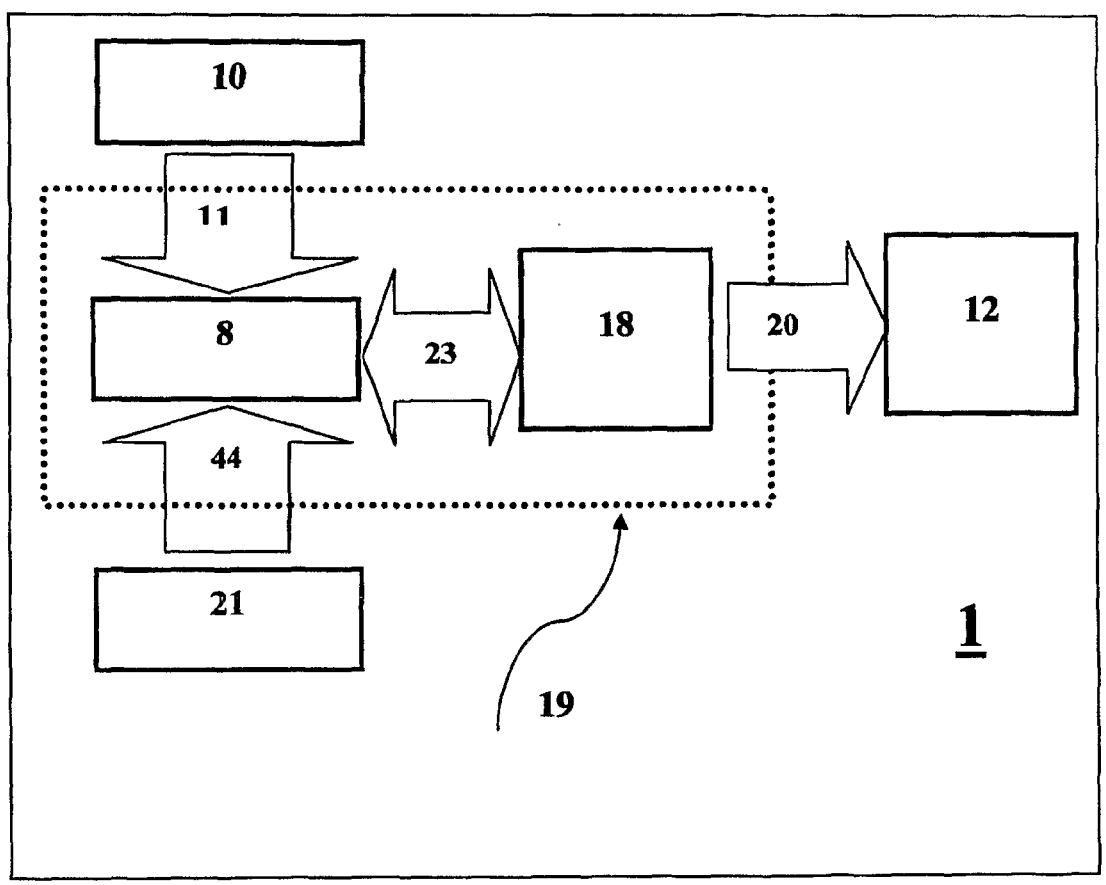
FIG. 3 is a simplified block diagram of the apparatus of the invention.

The terminal 2 can assume a first or separate operating configuration, shown in FIG. 1, in which the terminal 2 is separated from the supporting base 3 to read, for example, an optical code or an RFID tag, and a second operating or coupled configuration, shown in FIG. 3, in which the terminal 2 engages in the supporting base 3.

It should be noted that in the first operating configuration, an operator can grasp a portion of the terminal 2 so that the terminal 2 is taken to a suitable position for reading the optical code and the RFID tag associated with the object.

The terminal 2 comprises electric contact elements, of known and non-illustrated type, intended to interact, in the second operating configuration, with respective electric contact elements that are of known type and are not illustrated, of the supporting base 3. In this configuration, the supporting base 3 charges a battery with which the terminal 2 is equipped. This occurs both if the supporting base comprises a battery-charging device to charge the battery of the terminal 2, and if the supporting base comprises a supply device for supplying a battery-charging device provided in the terminal 2 and arranged for charging the battery of the terminal 2.

The terminal 2 comprises further electric contact elements, which are not illustrated, which are intended to interact, in the second operating configuration, with respective further electric contact elements, that are not illustrated, of the supporting base 3 to transmit data collected by the terminal 2.

In particular, the contact between the electric contact elements and the respective electric contact elements and the contact between the further electric contact elements and the respective further electric contact elements, constitutes a connection for the exchange of information, data and/or signals between the terminal 2 and the supporting base 3.

It should be noted that the terminal 2 and the supporting base 3 can be further connected by a radio-frequency device so that the data exchange, for example the data collected by the terminal 2 through reading the optical code or the information contained in the RFID tag can be transmitted to a processing unit such as a processing host computer associated with the supporting base 3.

The expression "data-collection device" or "terminal" is used in the present description and in the claims to indicate any device that is suitable for acquiring data associated with objects, such as the identifying data identifying the objects, manually through an operator (by for example keying in on the keyboard of a portable terminal) or automatically (by reading optical information or RFID tags associated with said objects). The portable data collection device can be a PDT.

The data-collection apparatus 1 illustrated in FIG. 1 and in FIG. 2 is in particular a PDT for reading optical information and/or information coded and stored in an RFID tag. As is known, the RFID tags can be read and/or written by radio frequency reading and/or writing devices (better known as RFID readers).

The expression "optical information" is used in the present description to indicate any graphical representation having the function of storing coded or non-coded information. A particular example of optical information consists of linear or two-dimensional optical codes in which the information is coded by suitable combinations of elements with a preset shape, for example squares, rectangles or hexagons of a dark (normally black) colour separated by light elements (spaces, normally white), such as barcodes, stacked codes and two-dimensional codes in general, colour codes, etc. The term "optical information" further comprises, more in general, also other graphical shapes, including printed characters (letters, numbers, etc) and particular shapes (patterns) (such as, for example, stamps, logos, signatures, finger prints, etc). The term "optical information" comprises graphical representations that are detectable along the entire wavelengths comprised between infrared and ultraviolet and thus not only in the field of visible light. In the present description, the expression "portable data collection device" is defined as a portable device that is capable of reading RFID tags and/or optical information through a plurality of possible acquisition techniques.

For example, acquisition can occur by illuminating an object, by means of an appropriate optical reception apparatus, the light can be collected that is diffused by the subject on a sensor consisting of an array of photosensitive elements of linear or matrix type, for example of CCD or CMOS type, and the generation of an image signal by integrated electronics or electronics associated with the sensor. The image signal generated in analogue or digital form can then be processed in the same device or in a separate image-processing apparatus.

Typically, in reading devices for reading coded optical information, such as barcodes and optical codes in general, the digital image signal is decoded to extract the information content of the code.

Devices of this type are known as linear or matrix cameras and in the case of optical information are also known as "imager" readers.

According to another technique, acquisition may occur by illuminating an object by scanning one or more laser beams, collecting light diffused or reflected by the subject on one or more photodiodes by an optical receiving apparatus, and generating, by dedicated electronics, an electric image signal that is representative of the diffusion/reflection of each point hit by the laser beam during scanning. This signal is then processed, and, in particular for coded optical information reading devices, it is digitalised and decoded. Devices of this type are generally known as "laser scanners". Instead of capturing an image with a single simultaneous acquisition for all the photosensitive images ("parallel"), as in cameras and imager readers, in laser scanners the image of the subject during scanning is captured in a sequential manner, instant by instant ("serially").

In order to read the RFID tags, on the other hand, the reading device generates an electromagnetic field at an excitation frequency for the transponder contained in the tag that, having entered this field, transmits to the reading device a signal containing the code stored in the transponder. A similar method is used to write information in the transponder.

As illustrated in FIGS. 1 and 2, the terminal 2 comprises a keyboard 4, display means 5, which may include, for example, a liquid crystal display (also LCD in English), pointing means 6, having a set of direction-setting pushbuttons 7 and first control means 8, such as, for example, the CPU of the terminal 2, shown in FIG. 3, to manage the terminal 2.

The terminal 2 further comprises Graphic User Interface means (or also GUI in English), displayed on the screen 5, that enables a user, using the keyboard 4 and/or the pointing means 6, to interact with the terminal 2.

The graphic user interface means typically comprises one or more graphic software applications of known type, managed by the first control means 8, which enable an operator both to access the data collected by the terminal 2 and to set parameters or preferences selected by the operator and stored by the terminal 2, as will be disclosed better below.

The terminal 2 further comprises detecting means 10 arranged for detecting and/or receiving parameters and/or operating data. As illustrated in the block diagram in FIG. 3, the detecting means 10 is connected to the first control means 8 by first coupling means 11, to exchange the aforesaid parameters and/or operating data.

The detecting means 10 comprises, for example, a receiver arranged for receiving wireless signals from a series of satellites of the GPS system (Global Positioning System) and is able to reconstruct, from such signals, for example a physical position of the terminal 2, to enable this position to be displayed inside a road map displayed to the operator by the graphic user interface means. In particular, the detecting means 10, via the GPS receiver, is able to detect a plurality of operating parameters such as, for example, speed, acceleration, altitude, geographical localisation of the terminal 2.

As the GPS receiver and the first control means 8 are integrated into the portable terminal 2, the first coupling means 11 is made by standard data-exchange techniques for integrated electronic devices (for example via internal BUS).

The reading apparatus 1 further comprises connecting means 12, which comprises first connecting means, which may be electromagnetic or of another commandable type, and second connecting means, which may be electromagnetic, magnetic or of another type, as can be seen better below, which is not commandable, which is arranged for removably locking the terminal 2 to the supporting base 3 in the second operating configuration in FIG. 2.

The first connecting means with which the terminal 2 is provided consists of electromagnets 13 provided in a coupling portion 14 of the terminal 2. In the second operating configuration, the coupling portion 14 is housed in a cavity 16 of the supporting base 3 and substantially abuts on walls 15 defining the aforesaid cavity 16.

The second connecting means with which the supporting base 3 is provided consists of permanent magnets 17 provided in a portion of the walls 15 of the supporting base 3, so that in the second operating configuration, the electromagnets 13 substantially face the permanent magnets 17.

The terminal 2 further comprises second control means 18 for commanding the connecting means 12.

As shown in FIG. 3, it should be known that the data collection apparatus 1 comprises control means 19 that includes the first control means 8 and the second control means 18.

The second control means 18 is connected to the connecting means 12 by second coupling means 20. As the second control means 18 and the first connecting means 13, commandable by the second control means 18, is integrated into the portable terminal 2, the second coupling means 20 is made by standard data-exchange techniques for integrated electronic devices.

If the operating parameter of interest for commanding the connecting means 12 is the speed of a vehicle in which the portable terminal 2 is installed, the second control means 18 is associated with the GPS detector of the detecting means 10 and acquires therefrom the speed of the terminal 2. The GPS detector thus constitutes a speed sensor means integrated into the terminal 2.

The second control means 18 conducts a comparison between the speed of the GPS detector and a preset reference or threshold speed value. When the speed of the terminal 2 is greater than or equal to the threshold value, the second control means 18 commands the connecting means 12 by setting a respective operating state for the terminal 2 corresponding to a "locked" operating status in the second operating configuration B of the apparatus 1.

In practice, the second control means 18 makes the electromagnet 13 of the terminal 2 to polarise in an opposite manner to the polarity of the permanent magnet 17 of the supporting base 3, so that the terminal 2 is firmly retained in the supporting base 3.

On the other hand, when the speed of the terminal 2 is less than the threshold value, the second control means 18 commands the connecting means 12 by setting a respective operating state for the terminal 2 corresponding to a "free" operating state (L).

In practice, the second control means 18 makes the electromagnet 13 of the terminal 2 remain in a non-polarised state to enable the terminal 2 to be removed from the supporting base 3.

The second control means 18 thus automatically manages the operating state of the terminal 2 during movements of the vehicle with which the data collection apparatus 1 is associated, locking the terminal 2 in the supporting base 3 according to the speed of the terminal 2 and preventing an operator from removing the terminal 2 from the supporting base 3.

It should be noted that the threshold speed value is modifiable to adapt the installation of the data collection apparatus 1 to various operating situations. In order to modify this threshold value and have complete management of other functions, the terminal 2 comprises a manual management application 21, displayed in the graphic user interface device that enables the connecting means 12 to be managed manually.

In particular, this manual management application 21 comprises a parameters management interface screen (which is not illustrated) by means of which an operator can set the threshold reference value, stored in the first control means 8 of the terminal 2. The new threshold value overwrites the preceding preset threshold value and the new threshold value becomes the threshold value beyond which the terminal 2 is locked in the supporting base 3.

Further, this manual management application 21 also comprises a supervision management interface screen by means of which an operator sets the operating state of the terminal 2 directly. Or, by means of this screen an operator can set the operating state of the terminal in "locked" state (B), indefinitely fixing the terminal 2 to the supporting base 3. This function, which is similar to an antitheft system of the device, is above all useful in the case of a terminal installed in an itinerant vehicle intended for journeys with many stops. The manual management application 21 thus constitutes interface means for setting an operating state (B; L) of the terminal 2.

Similarly, by means of the supervision management screen, an operator can set the operating state of the terminal 2 in "free" state (L), deactivating the connecting means 12. Similarly, by means of the supervision management screen, an operator can set the operating state of the terminal 2 in a "passenger" state, which enables the connecting means 12 with a retaining force that is less than "locked" state, enabling the portable terminal 2 to be removed by a passenger located in the vehicle together with the driver.

It should be noted that both the parameters management screen for managing the setting of the threshold value and the supervision management screen are screens that significantly change the behaviour of the device and are therefore enabled only for certain user profiles and are subjected to controlled access, i.e. access by username and password.

In order to guard against possible faults, the terminal 2 and/or the supporting base 3 comprise a pushbutton, which has not been illustrated, to override the previously set operating state. In other words, said pushbutton manually sets the operating state in "free state" (L), deactivating the connecting means 12, if the previously set state was "locked" state and on the other hand sets "locked" operating state, activating the connecting means 12, if the previously set state was "free" state.

Alternatively, said pushbutton can be set so as to free from the supporting base 3 the terminal 2 in any operating state in which the latter finds itself. In other words, the pushbutton manually sets the polarity of the electromagnet 13, independently of the control means 19 that commands the electromagnet 13.

Further, the terminal 2 comprises further detecting means 22 for detecting the presence of the terminal 2, which, by calculating the impedance at the electric contact elements, is able to understand whether the terminal 2 is inserted inside the supporting base 3. In this manner, the second control means 18 commands the connecting means 12 only in the case of the actual presence of the terminal 2 in the supporting base 3.

As said previously, the manual management application 21 manually managing magnetic connecting means 12 (management of parameters and supervision management) is part of known graphic software applications that are managed by the first control means 8 of the terminal 2, namely by the CPU of the terminal 2. The terminal 2 thus comprises third coupling means 23 between the first control means 8 and the second control means 18, so that, for example, the threshold reference value set by an operator is always communicated to the second control means 18.

If the first control means 8 and the second control means 18 are integrated into the terminal 2, the third coupling means 23 is made by standard data-exchange techniques for electronic devices.

Alternatively, if a single controller performs the function of the control means 19, the third coupling means 23 is absent.

In order to ensure greater flexibility of use, the terminal 2 comprises fourth coupling means 44 that connects the manual management application 21 and the first control means 8.

Figure 4A:
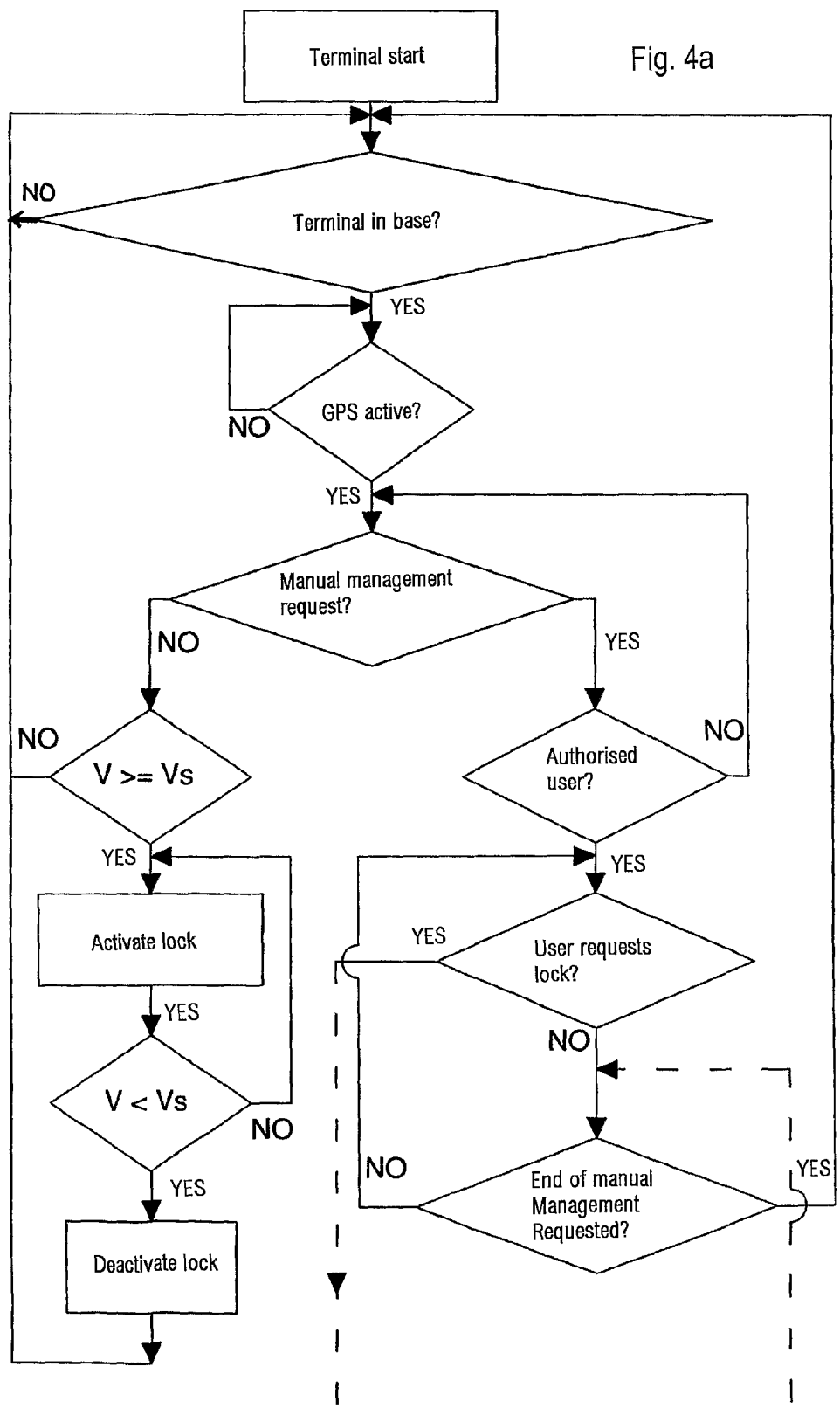
FIG. 4a and FIG. 4b illustrate a flow chart and an operating method of the portable data collection device in FIG. 1.
Figure 4B:
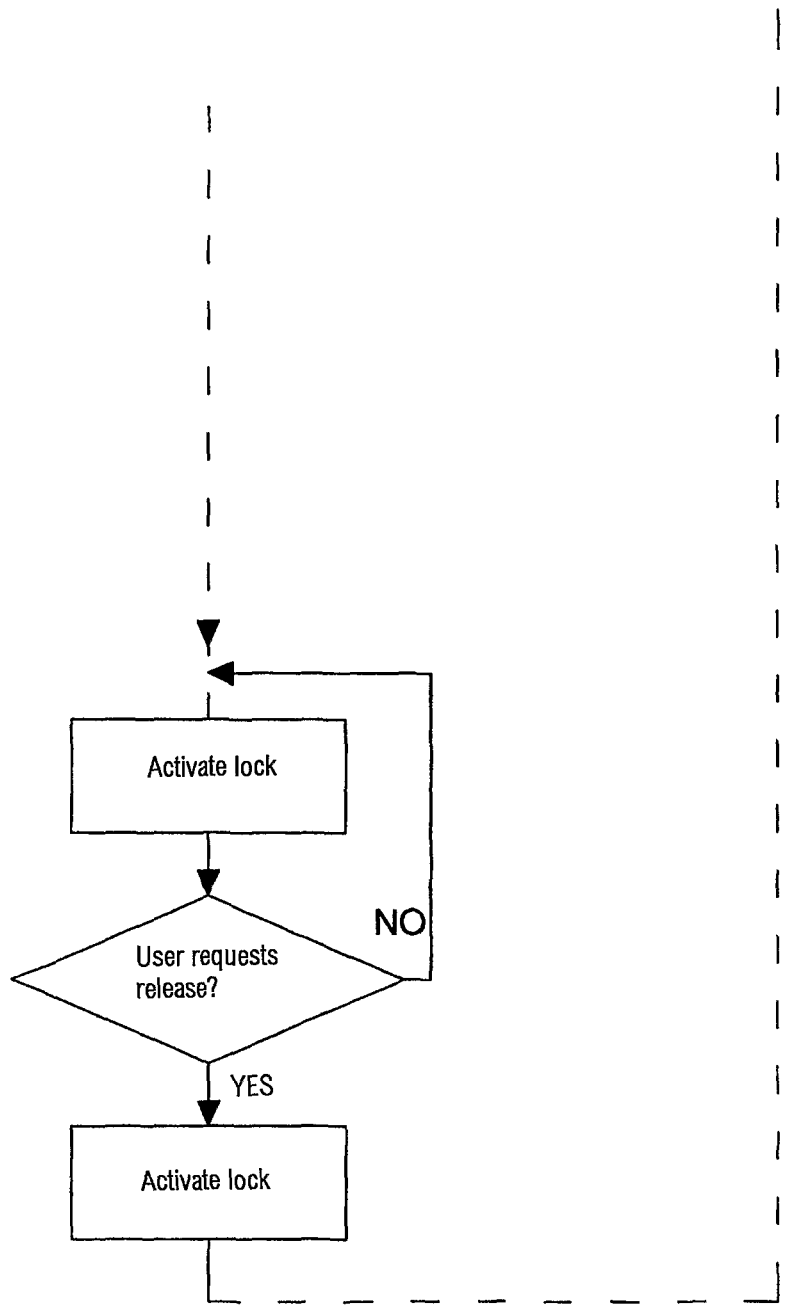

In use, as shown in FIGS. 4*a* and 4*b*, when the terminal 2 is switched on, if the terminal is inserted into the supporting base 3, as detected by the further detecting means 22 and if the GPS detector is active and operates as a speed sensor, the second control means 18 automatically manages retaining the terminal 2 in the supporting base 3. If the speed exceeds the preset threshold value the second control means 18 activates the locking of the terminal 2 in the supporting base, a lock that is deactivated only when the speed is below this preset value.

When the terminal 2 is powered up and when the speed is below the preset limit, the operator has access to the manual management application 21 by means of which, if authorised, the operator can set a new threshold value and activate/deactivate the lock of the terminal 2 in the supporting base 3.

It should therefore be noted that a terminal 2 according to the invention ensures the safety of an operator driving a vehicle thanks to automatic management of the locking of the terminal 2 in the supporting base 3.

The flexibility of this management is nevertheless ensured by the manual management application 21, which enables flexibility in setting the use parameters.

It must also be mentioned that such flexibility is advantageously obtained because it is based on operating parameters of the terminal 2, for example speed, with which a specific operating state is associated, for example "locked" or "free" state. There is thus a processing of the operating parameter of the device, so that depending on the value of the latter, i.e. whether it is above or below the threshold value, the operating state of the terminal 2 is set as "locked" state or on the other hand as "free" state. However, at the same time the operating state can also be set directly by the operator, for example in the case of malfunction or to ignore in certain conditions the "locked" state that would be set by the detected speed above the threshold value.

According to another embodiment, the detecting means 10 comprises an accelerometer, integrated into the terminal 2. The accelerometer thus constitutes speed sensor means integrated into the terminal 2.

According to a further embodiment, the GPS receiver is outside the terminal 2, and the first coupling means 11 between the GPS detector and the first control means 8 of the terminal 2 consist of a wireless connection, for example a Bluetooth connection.

According to still another embodiment, the detecting means 10 comprises the speedometer of the vehicle in which the terminal 2 is installed and the first coupling means 11 between the speed detecting means 10 and the first control means 8 of the terminal 2 consists of a Bluetooth wireless connection, or of a cabled connection from the speedometer of the vehicle to an inlet of the supporting base 3. In the latter case, the control means 8 receives the value of the physical speed of the vehicle by the electric contact elements or the further electric contact elements between the portable terminal 2 and supporting base 3. The speedometer thus constitutes speed sensor means integrated into the vehicle.

If the vehicle is very simple, such as, for example, a forklift intended for circulating inside a company and the speedometer has not been installed in the forklift, the control means 8 receives from the control unit of the forklift a signal indicating the movement of the forklift. The control unit of the forklift thus constitutes a movement sensor means integrated into the forklift.

According to a further embodiment, the manual management application 21 is integrated into a host system remotely connected (for example by GPRS, UMTS or Wi-Fi connection) by means of the fourth coupling means 44 to the supporting base 3. It should be noted that owing to this embodiment, the remote host system simultaneously and contemporaneously controls several terminals 2 and a supervisor of the operators can decide when and at which value the speed threshold value of each single terminal has to be set.

According to a further embodiment, the second control means 18 of the connecting means 12 is integrated into the supporting base 3. This case is particularly advantageous if the connecting means 12 comprises first connecting means consisting of an electromagnet 13 integrated into the supporting base 3 and second connecting means consisting of one permanent magnet 17 integrated into the terminal 2. The third coupling means 23 between the first control means 8 of the terminal 2 and the second control means 18 is made by wireless connection, for example by Bluetooth protocol.

Figure 6:
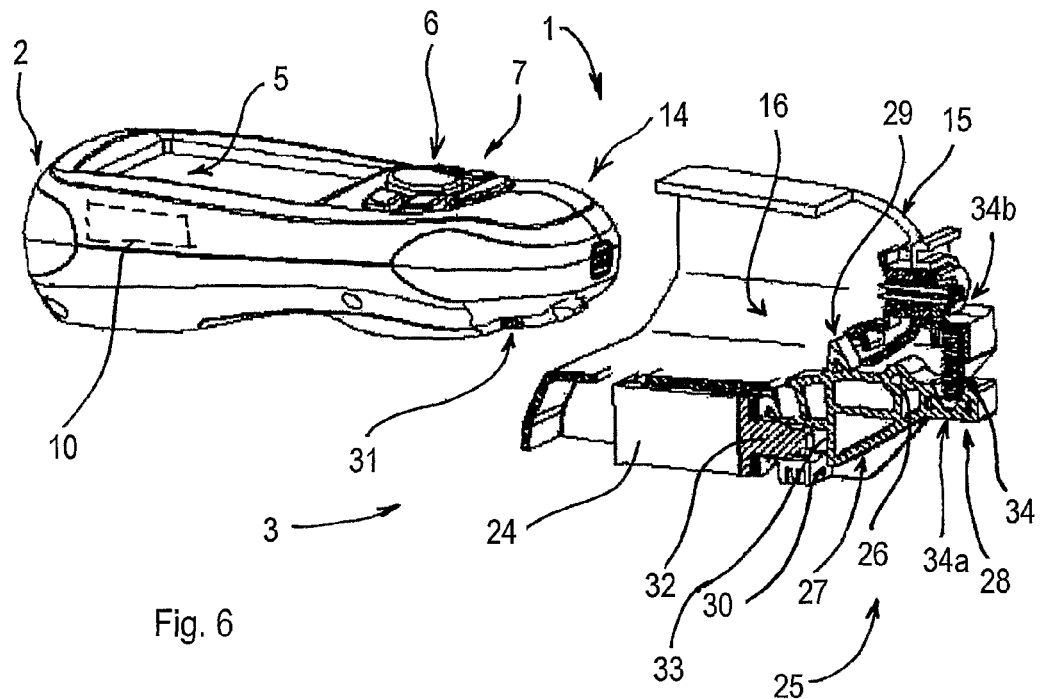
FIG. 6 is a perspective view of a further portable data collection device and of a supporting base in a first operating configuration, if the supporting base comprises a linear actuator acting on a stopping element.
Figure 7:
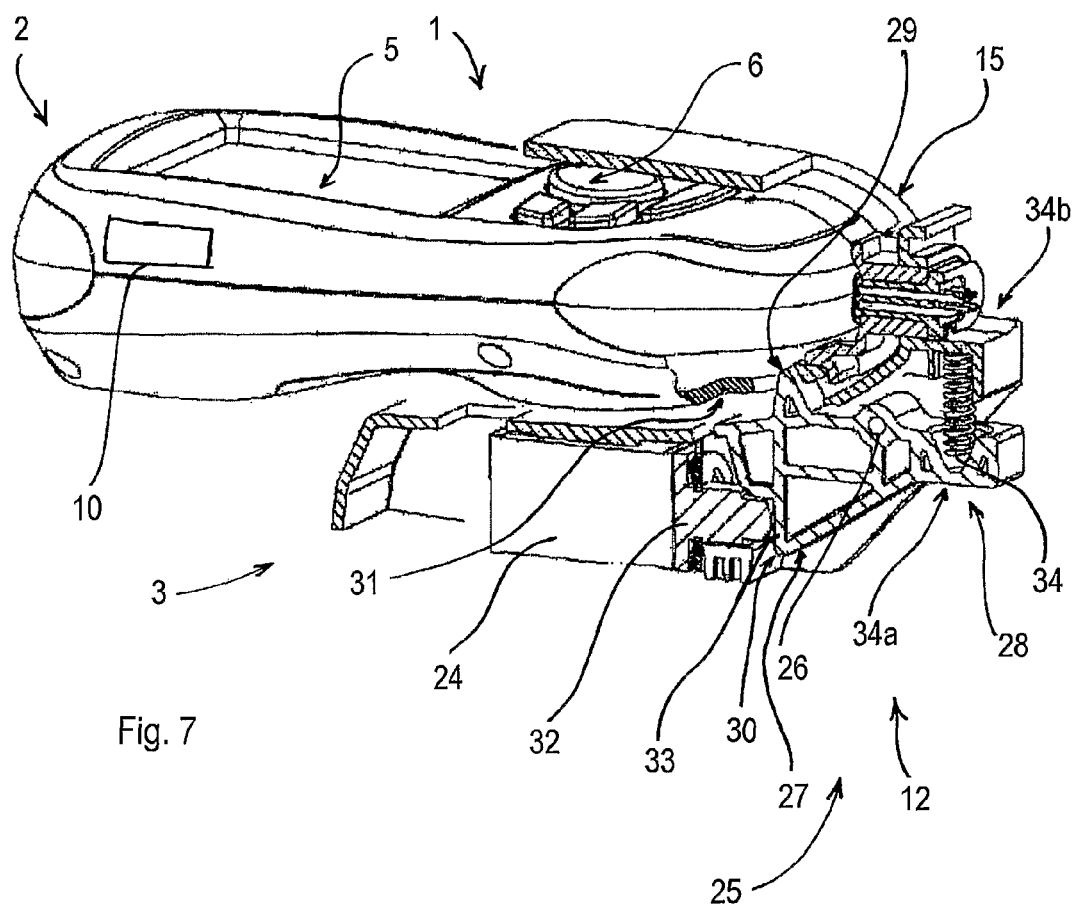
FIG. 7 is a perspective view of the portable data collection device and of the supporting base in FIG. 6 in a second operating configuration.

According to a further embodiment illustrated in FIGS. 6 and 7, the connecting means 12 integrated into the supporting base 3 comprises a linear actuator 24 that is electromagnetically controlled and acts on a stopping element 25, arranged for engaging with the terminal 2 so as to fix the terminal 2 to the supporting base 3 in the "locked" operating state (B).

The stopping element 25 is rotatably fixed to the supporting base 3 by a rotation fulcrum 26 and comprises a first portion 27 and a second portion 28 opposite said fulcrum 26. The first portion 27 is provided with a first end 29 and a second end 30, arranged for engaging respectively with a seat 31 of the terminal 2 and with an operating end 32 of the actuator 24. The first end 29 has a substantially tooth shape so as to be inserted firmly inside the seat 31 obtained in an outer casing of the terminal.

The second end 30 includes a recess 33 shaped for receiving said operating end 32.

The second portion 28 is provided with a housing 34a suitable for receiving an end of an elastic element 34, for example a coil spring, fixed to a further housing 34b obtained in the supporting base 3.

The stopping element 25, driven by the linear actuator 24 and/or by the spring 34, is rotatable between a release position and an engaging position, respectively for enabling or preventing the disengagement of the terminal 2 from the supporting base 3 in the second operating configuration.

In the engaging position the operating end 32 of the actuator 24 is arranged in an advanced position so as to act on the second end 30.

In the release position the operating end 32 of the actuator 24 is arranged in a retracted position and it is the spring 34 that acts on the second portion 28 of the stopping element 25.

It should be noted that according to this embodiment the connecting means 12 comprises first connecting means consisting of the actuator 24 integrated into the supporting base 3 and second connecting means consisting of the seat 31 obtained in the casing of the terminal 2.

Owing to this embodiment, the supporting base 3 comprising the linear actuator 24 and the stopping element 25 enables a terminal 2 to be obtained that is lighter and more compact. In addition to that, this embodiment of the supporting base is suitable for being used also with any portable data collection device, even of a previous design, provided that the portable data collection device is provided with the seat 31.

The further detecting means for detecting the presence of the terminal 2 (not illustrated in FIGS. 6 and 7) is housed in the supporting base 3 and the presence of the terminal 2, similarly to what was seen previously, is calculated by evaluating the impedance at the electric contact elements of the supporting base 3.

It should be noted that for all embodiments of the invention, if the detecting means 10, the first control means 8 and the second control means 18, or the control means 19, and the connecting means 12 are not entirely integrated into the terminal 2 or into the supporting base 3, but are distributed in the apparatus 1, the first coupling means 11, the second coupling means 20, the third coupling means 23 and the fourth coupling means 44 ensure that the logical communication between the various components and means remains unaltered. This enables, for example, an apparatus 1 to be obtained comprising a very simple terminal 2 and a very complex base 3, integrating both functions that are necessary for retaining the terminal 2 in the base 3, or, conversely, a very complex terminal 2 and a very simple base 3.

According to a further embodiment illustrated in FIG. 5, the data collection apparatus comprises a portable data collection device 102 that is housable in a supporting base (which is not illustrated), that differs from the device disclosed above through the fact that it does not comprise a keyboard or a displaying device.

In this case, in which it is not typically provided for that the GPS detector is integrated into the reading device 102, said GPS detector will be installed outside the apparatus 1. Further, the reading device 102 will comprise a manual management application the interaction of which with the operator is provided by reading of optical codes or of RFID tags with a particular meaning, the value of which is able to change, for example, the state of the reading device 102 from "locked" to "free".

In an alternative embodiment, the manual management application is integrated into a remotely connected host system, as previously disclosed, by fourth connecting means (not shown).

The manual management application thus constitutes interface means for setting an operating state (B; L) of the terminal 2.

What is claimed is:

1. A portable device engageable in a supporting base associable with a vehicle, said portable device comprising:
   first connecting means of commandable type, said supporting base being provided with second connecting means, said first connecting means being arranged for interacting with said second connecting means for locking or releasing said device in said supporting base;

detecting means for detecting at least an operating parameter of said vehicle, said operating parameter being selected from the group consisting of speed, acceleration, geographic localisation, and altitude of said device;

interface means for setting an operating state and a preset threshold value of the operating parameter of said device, said interface means comprising a manual management application for manually managing said operating state and setting the preset threshold value of said operating parameter to adapt an installation of the portable device to various operating situations; and control means connected to said detecting means and to said interface means to command said first connecting means as a function of said operating parameter and/or of said operating state, wherein said first connecting means is commandable for locking said device when said parameter is above or equal to the preset threshold value and is commandable for releasing said device from said base when said parameter is less than said preset threshold value, and/or wherein said first connecting means is arranged for locking said device when said operating state is a locked state and is arranged for releasing said device from said base when said operating state is a free state.

2. The device according to claim 1, wherein said detecting means comprises a GPS detector or an accelerometer.

3. The device according to claim 1, wherein said detecting means comprises a speed sensor integrated into said device, said detecting means is connected to a speed sensor integrated into said supporting base, or said detecting means is integrated into said vehicle.

4. The device according to claim 1, wherein said first connecting means is arranged for locking said device to said supporting base in a locked operating state when the speed of said device is greater than or equal to a preset threshold value, and is arranged for releasing said device from said base in a free operating state when the speed of said device is less than said preset threshold value.

5. The device according to claim 4, wherein said interface means is a graphic user interface suitable for setting said preset threshold value.

6. The device according to claim 1, wherein said first connecting means comprises at least an electromagnet and said second connecting means comprises at least one permanent magnet.

7. The device according to claim 1 further comprising further detecting means for detecting the presence of said device in said base, said control means being arranged for commanding said first connecting means in the presence of said device in said base.

8. A supporting base of an apparatus suitable for receiving a portable device engageable in said supporting base and associable with a vehicle, said base comprising:

first connecting means of commandable type, said portable device being provided with second connecting means, said first connecting means being arranged for interacting with said second connecting means for locking or releasing said device in said base, said device comprising:
detecting means for detecting at least an operating parameter of said vehicle, said operating parameter being selected from the group consisting of speed, acceleration, geographical localisation and altitude of said device;

interface means for setting an operating state and a preset threshold value of the operating of said device, said interface means comprising a manual management application for manually managing said operating state and setting the preset threshold value of said operating parameter to adapt an installation of the portable device to various operating situations;

said base comprising control means connectable to said detecting means and to said interface means of said device to command said first connecting means as a function of said operating parameter and/or of said operating state, said operating parameter and/or said operating state being exchanged by the device when connected to the base, wherein said first connecting means is commandable for locking said device when said parameter is above or equal to the preset threshold value and is commandable for releasing said device from said base when said parameter is less than said preset threshold value; and/or wherein said first connecting means is arranged for locking said device when said operating state is a locked state and is arranged for releasing said device from said base when said operating state is in a free state.

9. The supporting base according to claim 8, wherein said detecting means comprises a GPS detector or an accelerometer.

10. The supporting base according to claim 8, wherein said detecting means comprises a speed sensor integrated into said device, said detecting means is connected to a speed sensor integrated into said supporting base, or said detecting means is integrated into said vehicle.

11. The supporting base according to claim 8, wherein said first connecting means locks said device to said supporting base in a locked operating state when the speed of said device is greater than or equal to a preset threshold value, and releases said device from said base in a free operating state when the speed of said device is less than said preset threshold value.

12. The supporting base according to claim 8, wherein said first connecting means comprises at least an electromagnet and said second connecting means comprises at least a permanent magnet.

13. The supporting base according to claim 8, wherein said first connecting means comprises at least an actuator acting on a stopping element and said second connecting means comprises at least a seat contained in an outer casing of said device, said stopping element being suitable for engaging in said seat to lock said device to said supporting base in a locked operating state.

14. The supporting base according to claim 8, comprising a pushbutton that is actuatable by a user to command said first connecting means, overriding the previously set operating state or releasing said device from said base in a free operating state.

15. An apparatus comprising:
a portable-device and a supporting base associable with a vehicle, said portable device being engageable in said supporting base;

connecting means comprising first connecting means of commandable type, and second connecting means, said first connecting means being arranged for interacting with said second connecting means for locking or releasing said device in said base;

detecting means for detecting at least an operating parameter of said vehicle, said operating parameter being selected from the group consisting of speed, acceleration, geographical localisation and altitude of said device;

interface means for setting an operating state and a preset threshold value of the operating parameter of said device, said interface means comprising a manual management application for manually managing said operating state and setting the preset threshold value of said operating parameter to adapt an installation of the portable device to various operating situations; and control means connected to said detecting means and to said interface means to command said connecting means as a function of said operating parameter and/or of said operating state, wherein said first connecting means is commandable for locking said device when said parameter is above or equal to the preset threshold value and is commandable for releasing said device from said base when said parameter is less than said preset threshold value, and/or wherein said first connecting means is arranged for locking said device when said operating state is a locked state and is arranged for releasing said device from said base when said operating state is a free state.

16. The apparatus according to claim 15, wherein said detecting means comprises a GPS detector or an accelerometer.

17. The apparatus according to claim 15, wherein said detecting means comprises a speed sensor integrated into said device said detecting means is connected to a speed sensor integrated into said supporting base, or said detecting means is integrated into said vehicle.

18. The apparatus according to claim 15, wherein said device is lockable by said first connecting means to said supporting base in a locked operating state when the speed of said device is greater than or equal to a preset threshold value, and said device is releasable from said base in a free operating state when the speed of said device is less than said preset threshold value.

19. The apparatus according to claim 18, wherein said interface means is a graphic user interface integrated into said device and suitable for setting said preset threshold value, or wherein said interface means is a graphic user interface integrated into a computer connected remotely to said base and suitable for setting said preset threshold value.

20. The apparatus according to claim 15, wherein said first connecting means comprises at least an electromagnet and said second connecting means comprises at least one permanent magnet.

21. The apparatus according to claim 15, wherein said first connecting means comprises at least an actuator acting on a stopping element and said second connecting means comprises at least a seat of said device or of said base, said stopping element being suitable for engaging in said seat to lock said device to said supporting base in a locked operating state.

22. The apparatus according to claim 15, further comprising further detecting means for detecting the presence of said device in said base, said control means commanding said connecting means in the presence of said device in said base.

23. The apparatus according to claim 15 wherein said apparatus comprises first coupling means for the data exchange between said detecting means and said control means, and second coupling means for the data exchange between said control means and said connecting means.

24. The apparatus according to claim 23 wherein said apparatus comprises a wireless communication system including the first coupling means and said second coupling means.

25. The apparatus according to claim 15, comprising a pushbutton that is actuatable by a user to command said first connecting means, overriding the previously set operating state or releasing said device from said base in a free operating state.

26. A method for controlling an apparatus comprising a portable device, a supporting base associable with a vehicle, said portable device being engageable in said supporting base, and connecting means comprising first connecting means of commandable type and second connecting means, said first connecting means interacting with said second connecting means to lock or release said device in said base, said method comprising the steps of:

detecting at least an operating parameter of said vehicle, said operating parameter being selected from the group consisting of speed, acceleration, geographical localisation and altitude of said device, and/or setting an operating state of said device; and commanding said connecting means as a function of said operating parameter and/or of said operating state, wherein said commanding said connecting means comprises:

actuating said first connecting means to lock said device to said supporting base when said parameter is above or equal to a preset threshold value and actuating said first connecting means for releasing said device from said base when said parameter is less than said preset threshold value; and actuating said first connecting means for locking said device when said operating state is a locked state and releasing said device from said base when said operating parameter is a free state, the method further comprising the step of receiving through a manual management application the preset threshold value of said operating parameter.

27. The method according to claim 26, comprising the step of, before said detecting, checking the presence of said device in said base and checking that detecting means of said apparatus suitable for detecting said parameter is active.

28. The method according to claim 26 wherein said operating state is settable by a user by means of a manual management application.

29. A portable device engageable in a supporting base associable with a vehicle, said portable device comprising: first connecting means of commandable type, said supporting base being provided with second connecting means, said first connecting means being arranged for interacting with said second connecting means for locking or releasing said device in said supporting base; detecting means for detecting at least an operating parameter of said vehicle, said operating parameter being selected from in the group consisting of speed, acceleration, geographical localisation and altitude of said device; interface means for setting an operating state of said device and a preset threshold value of the operating parameter of said device, said interface means comprising a manual management application for manually managing said operating state and setting the preset threshold value of said operating parameter to adapt an installation of the portable device to various operating situations; and control means connected to said detecting means and to said interface means to command said first connecting means as a function of said operating parameter and/or of said operating state; wherein said first connecting means is commandable for locking said device when said parameter is above or equal to a preset threshold value and is commandable for releasing said device from said base when said parameter is less than said preset threshold value; and/or wherein said first connecting means is arranged for locking said device when said operating state is a locked state and is arranged for releasing said device from said base when said operating state is in a free state; wherein said portable device is a portable data collection device suitable for acquiring data associated with objects, such as the identifying data identifying the objects, manually through an operator or automatically by reading optical information or RFID tags associated with said object.

* * * * *

UNITED STATES PATENT AND TRADEMARK OFFICE
CERTIFICATE OF CORRECTION

PATENT NO. : 8,897,927 B2
APPLICATION NO. : 13/142020
DATED : November 25, 2014
INVENTOR(S) : Alessandro Chiarini Page 1 of 1

It is certified that error appears in the above-identified patent and that said Letters Patent is hereby corrected as shown below:

In the Claims

Column 12, line 2, insert --parameter-- after the word operating

Signed and Sealed this
Nineteenth Day of May, 2015

Michelle K. Lee
*Director of the United States Patent and Trademark Office*